Dec. 9, 1969

C. NEWSTEAD 3,482,460

ROLLER EXPANDER ACTUATOR FOR VEHICLE BRAKES

Filed July 15, 1968

United States Patent Office 3,482,460
Patented Dec. 9, 1969

3,482,460
ROLLER EXPANDER ACTUATOR FOR
VEHICLE BRAKES
Charles Newstead, Walsall, England, assignor to Girling Limited, Birmingham, Warwickshire, England
Continuation-in-part of application Ser. No. 669,084, Sept. 20, 1967. This application July 15, 1968, Ser. No. 745,049
Claims priority, application Great Britain, Sept. 24, 1966, 42,734/66
Int. Cl. F16h 21/44, 25/18
U.S. Cl. 74—110                3 Claims

ABSTRACT OF THE DISCLOSURE

This invention provides rectangular plates for the inner ends of oppositely displaceable tappets of circular cross-section in a so-called roller expander actuator for vehicle brakes. The benefits of circular section tappets (which only need simple annular seals) can thus be combined with the increased path length of the rollers in the roller assembly, obtained by rectangular section tappets. The plates may be spigotted to the tappets.

---

This application is a continuation-in-part of my pending application Ser. No. 669,084 filed Sept. 20, 1967.

This invention concerns vehicle brake actuators of the so-called roller expander type. The invention is applicable (though not exclusively) to a roller expander actuator of the type disclosed in my above mentioned U.S. patent application.

Various proposals have already been made in relation to roller expander mechanisms for vehicle brake actuation but problems arise, for example, in keeping the rollers in their correct positions with respect to members such as wedges with which they are intended to co-operate in order to produce the expander action.

Conventionally a brake actuator comprises tappets having opposed inclined ends each engaged by a roller assembly, appropriate movement of which between the tappets causes the latter to move apart to actuate the brake.

Although the roller assembly may comprise a single roller, it is found in practice that a plurality of rollers is preferable. Where tappets of circular cross-section are employed a problem arises in that the path length over the tappet end face is different for a roller positioned centrally of the tappet face from that of a roller displaced to one side of the centre. An outer roller will therefore have a reduced path length as compared with a central roller.

The available tappet displacement is governed by the aforementioned path length and it is an object of the invention to obtain the maximum tappet displacement for tappets of a given size.

According to the present invention in a brake actuator employing tappets of circular cross-section which are urged apart by a multiple roller assembly comprising a plurality of rollers of the same diameter and situated between the tappets, a bearing pad of rectangular cross-section is secured to an inclined inner end face of each tappet to provide an equal path length for each roller of the roller assembly.

Figure 1:
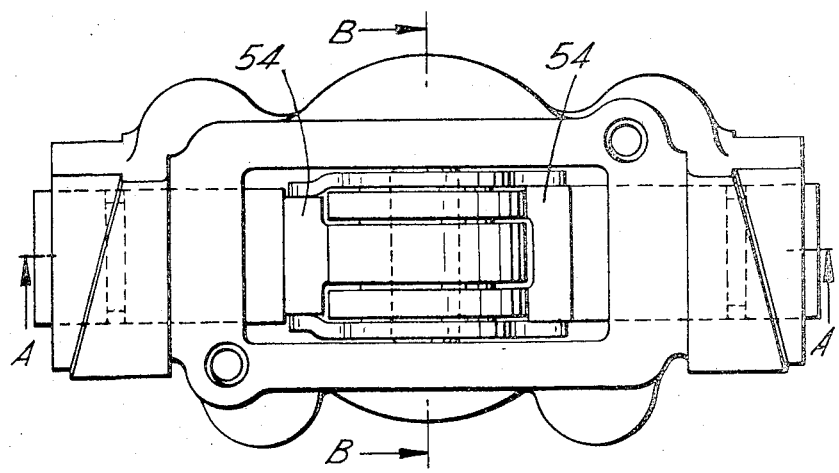
Figure 2:
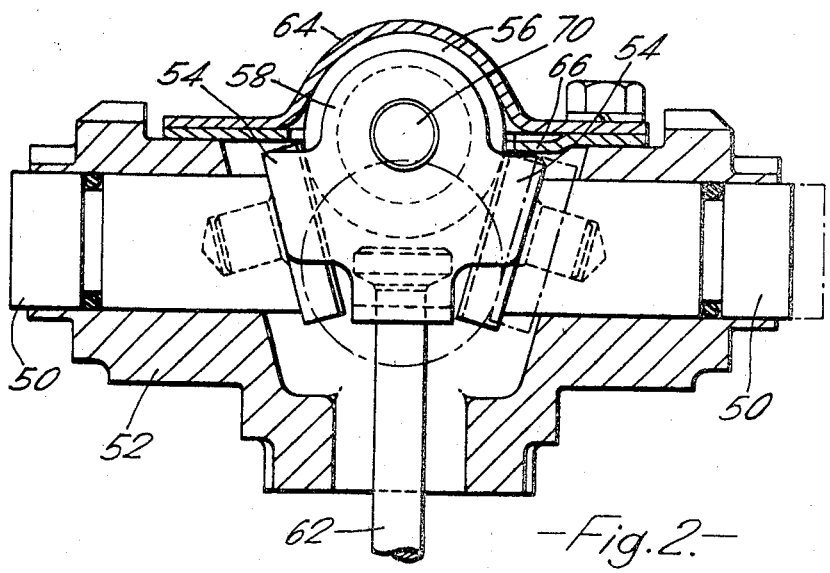
Figure 3:
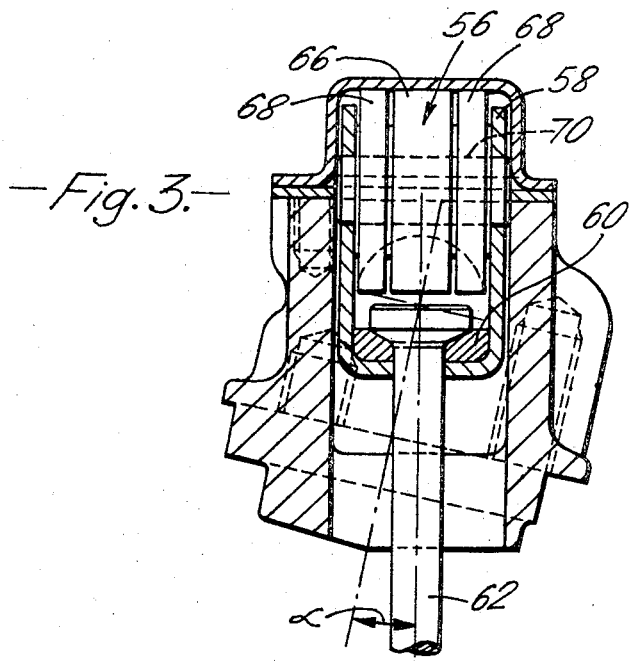

The invention will be described further, by way of example, with reference to the accompanying drawings, in which:

FIG. 1 is a plan view of an actuator embodying the invention, with a cover removed for clarity, FIG. 2 is an axial section taken on line A—A of FIG. 1, and FIG. 3 is a sectional detail taken on the line B—B of FIG. 2.

The invention as illustrated in the drawings is shown as being applied to a carrier-actuated drum brake arrangement in which mechanically displaced tappets operate against carriers which in turn apply the brake shoes to the drum. It will, however, be understood that the invention may equally well be used in a brake without carriers, in which case the tappets directly engage the shoe ends.

FIGS. 1, 2 and 3 of the drawings illustrate an embodiment of the invention wherein two oppositely displaceable tappets 50 are guided in aligned bores in a housing 52. The two tappets are of circular cross-section and rectangular bearing pads 54 are spigotted into the inclined inner end faces of the two tappets. The bearing pads 54 are formed from hard wearing material and as best seen in FIG. 1, they are of differing width. A roller assembly generally designated 56 is carried by a yoke 58 which is generally U-shaped and includes a rectangular insert 60 (see FIG. 3) at its lower end having a frusto-spherical recess which constitutes a seating for the head of a pull rod 62. Again referring particularly to FIG. 1, the two bearing pads 54 are a close slipping fit between opposite sides of the U-shaped yoke 58 which serves to centralise the yoke within the housing 52. The roller assembly 56 is comprised of two outer rollers 68 and an inner roller 66, the three rollers being the same diameter.

The housing is closed by a cover 64 the right hand end of which includes an internal abutment 66, formed by inward deformation of the cover. In order that the right hand tappet clears this abutment, the bearing pad 54 mounted thereon is shorter than the corresponding pad 54 on the left hand tappet. It will be appreciated that because of the abutment 66 the cover could not be fitted to the housing if the tappets were incorrectly assembled. Likewise the tappets cannot be incorrectly fitted in the yoke since they are of differing width and the yoke is dimensioned accordingly.

In order to facilitate mounting adjacent parts of the complete brake assembly the housing 52 is adapted for fitting to a brake backplate (not shown) so that the pull-rod 62 projects from the backplate at an angle X (see FIG. 3). Preferably this angle X equals 11°30'.

It will be appreciated that by providing the pads 54, the path length for the outer rollers 68 is the same as the path length for the central roller 66.

I claim:
1. In a brake actuator employing tappets of circular cross-section which are urged apart by a multiple roller assembly comprising a plurality of rollers of the same diameter situated between the tappets, and rotatable about a common axis, a bearing pad of rectangular cross-section is secured to the inner end face of each tappet to provide an equal path length for each roller of the roller assembly.

2. A brake actuator as set forth in claim 1 wherein the bearing pads are spigotted to the tappets.

3. A brake actuator as set forth in claim 1 further comprising a U-shaped yoke having two arms between which the bearing assembly is mounted and the bearing pads are slidably received between the two arms of the yoke.

References Cited

UNITED STATES PATENTS

| 3,004,804 | 11/1961 | Pinkus et al. | 308—73 |
| 3,072,209 | 1/1963 | Perry | 308—3 |
| 3,362,506 | 1/1968 | Mossey | 74—110 |

FRED C. MATTERN, Jr., Primary Examiner

W. S. RATLIFF, Jr., Assistant Examiner

U.S. Cl. X.R.

308—3, 73; 188—78